United States Patent
Das et al.

(10) Patent No.: US 10,956,504 B2
(45) Date of Patent: Mar. 23, 2021

(54) GRAPH DATABASE QUERY CLASSIFICATION BASED ON PREVIOUS QUERIES STORED IN REPOSITORY

(71) Applicant: ENTIT Software LLC, Sunnyvale, CA (US)

(72) Inventors: Mahashweta Das, Palo Alto, CA (US); Alkis Simitsis, Palo Alto, CA (US); William K. Wilkinson, Palo Alto, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 292 days.

(21) Appl. No.: 15/760,378

(22) PCT Filed: Sep. 23, 2015

(86) PCT No.: PCT/US2015/051746
§ 371 (c)(1),
(2) Date: Mar. 15, 2018

(87) PCT Pub. No.: WO2017/052539
PCT Pub. Date: Mar. 30, 2017

(65) Prior Publication Data
US 2018/0268079 A1    Sep. 20, 2018

(51) Int. Cl.
*G06F 16/903* (2019.01)
*G06F 16/28* (2019.01)
(Continued)

(52) U.S. Cl.
CPC ........ *G06F 16/90335* (2019.01); *G06F 16/28* (2019.01); *G06F 16/9024* (2019.01); *G06F 17/18* (2013.01)

(58) Field of Classification Search
CPC .......... G06F 16/90335; G06F 16/9024; G06F 16/28; G06F 17/18; G06F 16/9035;
(Continued)

(56) References Cited

U.S. PATENT DOCUMENTS 5,768,578 A * 6/1998 Kirk ...................... G06F 16/954
8,041,729 B2  10/2011 Vandelle et al.
(Continued)

FOREIGN PATENT DOCUMENTS

JP    2014142848    8/2014

OTHER PUBLICATIONS

PCT International Search Report; cited in PCT/US2015/051746; dated Jul. 11, 2016; 3 pages.
(Continued)

*Primary Examiner* — Pierre M Vital
*Assistant Examiner* — Andalib F Lodhi

(57) ABSTRACT

Examples for graph database query classification include receiving a graph query and determining if the graph query matches benchmark data. In the event that the graph query does not match benchmark data, the query may be parsed, a canonical internal representation of the query may be determined, the representation may be mapped to a rule, and the query may be classified based on the rule. In the event that the confidence score for the query classification does not exceed a threshold, the query may be sent to a synthetic graph or synopsis for simulation. In some examples, the simulation may include selecting computationally expensive graph operators in the query for simulation.

16 Claims, 4 Drawing Sheets

(51) Int. Cl.
*G06F 16/901* (2019.01)
*G06F 17/18* (2006.01)

(58) Field of Classification Search
CPC .............. G06F 16/2471; G06F 16/248; G06F 16/2455; G06F 16/285; G06F 16/00; G06F 16/164; G06F 16/148; G06F 16/338; G06F 16/9038; G06F 16/3331; G06F 16/24575; G06F 40/211; G06F 16/583; G06F 16/2423; G06F 16/3325; G06F 16/353; G06F 16/9538; G06F 16/24553; G06F 16/3323; G06F 16/906; G06F 16/93

See application file for complete search history.

(56) References Cited

U.S. PATENT DOCUMENTS

| | | | |
|---|---|---|---|
| 8,396,884 B2 | 3/2013 | Singh et al. | |
| 9,542,450 B1* | 1/2017 | Jacobsson | G06F 16/24578 |
| 2008/0319957 A1* | 12/2008 | Muralidhar | G06F 16/24526 |
| 2009/0055388 A1 | 2/2009 | Song et al. | |
| 2010/0281012 A1 | 11/2010 | Imig et al. | |
| 2014/0172914 A1* | 6/2014 | Elnikety | G06F 16/9024 707/774 |
| 2014/0229496 A1* | 8/2014 | Minami | G06F 16/9024 707/756 |
| 2015/0026158 A1 | 1/2015 | Jin et al. | |
| 2015/0074041 A1* | 3/2015 | Bhattacharjee | G06F 16/283 707/607 |
| 2015/0120736 A1* | 4/2015 | Miyata | G06F 16/9024 707/738 |
| 2015/0227582 A1* | 8/2015 | Gu | G06F 16/958 707/713 |
| 2016/0357799 A1* | 12/2016 | Choi | H04L 9/3066 |
| 2017/0078324 A1* | 3/2017 | Bordawekar | H04L 63/1408 |

OTHER PUBLICATIONS

A. Jindal et al., "Graph Analytics using the Vertica Relational Database" arXiv:1412.5263, 2014, 10 pages.
A. Welc et al., "Graph Analysis Do We Have to Reinvent the Wheel?" GRADES@SIGMOD, 2013, 6 pages.
B. Shao et al., "Trinity: a distributed graph engine on a memory cloud" SIGMOD 2013, pp. 505-516.
P.A. Boncz, "LDBC: benchmarks for graph and RDF data management", IDEAS 2013, 3 pages.
R. Han et al., "On Big Data Benchmarking", BPOE@ASPLOS/VLDB 2014, 7 pages.

* cited by examiner

GRAPH DATABASE QUERY CLASSIFICATION BASED ON PREVIOUS QUERIES STORED IN REPOSITORY

BACKGROUND

Computing systems, devices, and electronic components may access, store, process, or communicate with a database or databases. A database may store data or information in various formats, models, structures, or systems, such as in a graph database structure. Users or processes may access or query the databases to fetch or retrieve data in a database, or to update or manipulate data in a database. Various query types or classifications may be used to query a database.

BRIEF DESCRIPTION OF THE DRAWINGS

The following detailed description references the drawings, wherein.

DETAILED DESCRIPTION

Figure 1:
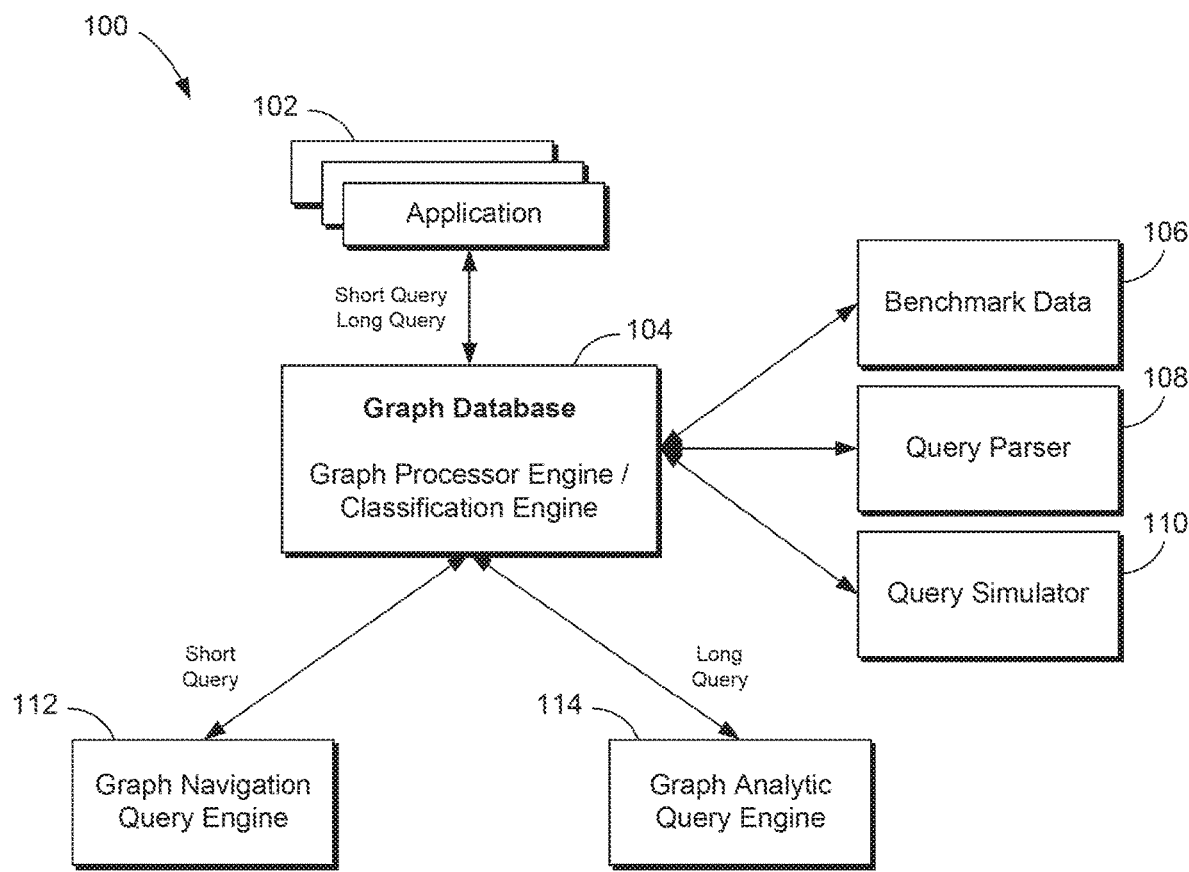
FIG. 1 is a block diagram of a system for graph database query classification, according to an example.

Various examples described below for graph database query classification include receiving a graph query and determining if the graph query matches benchmark data. In the event that the graph query does not match benchmark data, the query may be parsed, a canonical internal representation of the query may be determined, the representation may be mapped to a rule, and the query may be classified based on the rule. In the event that a confidence score for the query classification does not exceed a threshold, the query may be sent to a synthetic graph for simulation. In some examples, the simulation may include computing a graph synopsis for the query and selecting computationally expensive graph operators in the query for simulation to classify the query.

In examples described herein, in the event that a graph query classification is a navigation short query type, the query may be processed, e.g., on a real-time graph on a graph navigation query engine. In the event that the graph query classification is an analytic long query type, the query may be processed, e.g., on a historical graph on a graph analytic query engine.

As the amount of information stored on computing devices has continued to expand, companies, organizations, and information technology departments have adopted new technologies to accommodate the increased size and complexity of data sets, often referred to as big data. Traditional data processing or database storage systems and techniques such as relational databases or relational database management systems ("RDBMS"), which rely on a relational model and/or a rigid schema, may not be ideal for scaling to big data sets. Similarly, such databases may not be ideal or optimized for handling certain data, such as associative data sets.

Organizations may employ a graph database to collect, store, query, and/or analyze all or a subset of the organization's data, and in particular large data sets. A graph database may be employed within an organization alone, in combination with other graph databases, or in combination with relational databases or other types of databases.

A graph database may process different types of requests, such as navigation or "short" queries including navigation computations and reachability queries (e.g., nearest neighbor), or analytic or "long" queries including analytic computations and iterative processing (e.g., page rank or connected components). A navigation query may, in an example, access and update a small portion of a graph to return a real-time response, while an analytic query may access a large fraction of the graph. Graph databases may be specialized, tailored, or "tuned" for a particular type of workload, query, or algorithm, such as for navigation queries, analytic queries, or other query types.

In such examples, a graph database tuned for navigation or short queries may comprise internal data structures designed for high throughput and read and write access to a small portion of a graph, and may not perform well with analytic queries. Conversely, graph databases tuned for analytic or long queries may assume an immutable graph which enables the use of data structures to index and compress the graph so that large portions of the graph can be processed quickly, minimizing the computational resources available to process navigation queries.

A graph database or graph query processing engine may receive a request or query that is independent of a workload, e.g., a general purpose query, that is not classified as a query type such as a long or short query. In such examples, a graph database, graph query processing engine, or other engine responsible for processing a query may not be equipped to determine which query engine should process the query, or which query engine would be optimized to process a certain query. The issue may be particularly challenging when information available about the query is limited.

FIG. 1 is a block diagram of a system for graph database query classification, according to an example. FIG. 1 may be referred to as graph database environment 100 or mixed-workload environment.

In the example of FIG. 1, a graph database 104 in graph database environment 100 may comprise a graph processing engine (or "classification engine") for collecting and/or storing data, and for executing queries, updates, requests, and/or transactions. The graph database may be any database type that employs graph structures to store data using, for example, edges, vertices, and/or properties to represent and/or store data. Graph database 104 may comprise a hybrid infrastructure to receive various query types, e.g., navigation queries, analytic queries, or other graph database queries.

The graph database 104 may reside in a data center, cloud service, or virtualized server infrastructure (hereinafter "data center"), which may refer to a collection of servers and other computing devices that may be on-site, off-site, private, public, co-located, or located across a geographic area or areas. A data center may comprise or communicate with computing devices such as servers, blade enclosures, workstations, desktop computers, laptops or notebook computers, point of sale devices, tablet computers, mobile phones, smart devices, or any other processing device or equipment including a processing resource. In examples described herein, a processing resource may include, for example, one processor or multiple processors included in a single computing device or distributed across multiple computing devices.

In the example of FIG. 1, the graph database 104 may reside on a computing device that includes a processing resource and a machine-readable storage medium comprising or encoded with instructions executable by the processing resource, as discussed below in more detail with respect to FIGS. 2-4. In some examples, the instructions may be implemented as engines or circuitry comprising any combination of hardware and programming to implement the functionalities of the engines or circuitry, as described below.

Graph database 104 may receive queries or updates from applications 102, which may be applications, processes, tools, scripts, or other engines for purposes of communicating with graph database 104. The queries received from application 102 may be navigation or short queries that access a small portion of a graph stored on graph database 104 using requests such as nearest neighbor, or other requests that access only a few vertices and/or edges of a graph. The queries received from application 102 may also be analytic or long queries that access a large portion of a graph stored on graph database 104 using requests such as a page rank or connected components. In some examples, navigation queries may be executed against a real-time, active, current, or "live" graph, while analytic queries may be executed against a historical graph.

Graph database 104 may comprise or communicate with an engine or engines for executing or processing queries. In an example, an engine may be tuned or adapted to a specific type of query. For example, graph navigation query engine 112 may be tuned for executing navigation or short queries, as discussed above, while graph analytic: query engine 114 may be tuned for executing analytic or long queries, as discussed above. In such examples, graph database 104 may receive queries of varying types. Graph database 104 may include an engine for classifying the received queries, with the classifications used to determine which of the query engines should receive a query.

Graph database 104 may comprise or communicate with a repository of benchmark data 106. As discussed below in more detail, the repository of benchmark data 106 may be a log of previously submitted queries, query types, query classifications, and/or engine information.

Graph database 104 may comprise or communicate with a query parser 108. As discussed below in more detail, query parser 108 may be used to parse a query and retrieve a canonical internal representation.

Graph database 104 may comprise or communicate with a query simulator 110. As discussed below in more detail, query simulator 110 may be used to simulate a query on a small synthetic graph to determine a query classification.

In the example of FIG. 1, graph database 104, repository of benchmark data 106, query parser 108, query simulator 110, graph navigation query engine 112, and graph analytic query engine 114 may be directly coupled or communicate directly, or may communicate over a network. A network may be a local network, virtual network, private network, public network, or other wired or wireless communications network accessible by a user or users, servers, or other components. As used herein, a network or computer network may include, for example, a local area network (LAN), a wireless local area network (WLAN), a virtual private network (VPN), the Internet, a cellular network, or a combination thereof.

Figure 2:
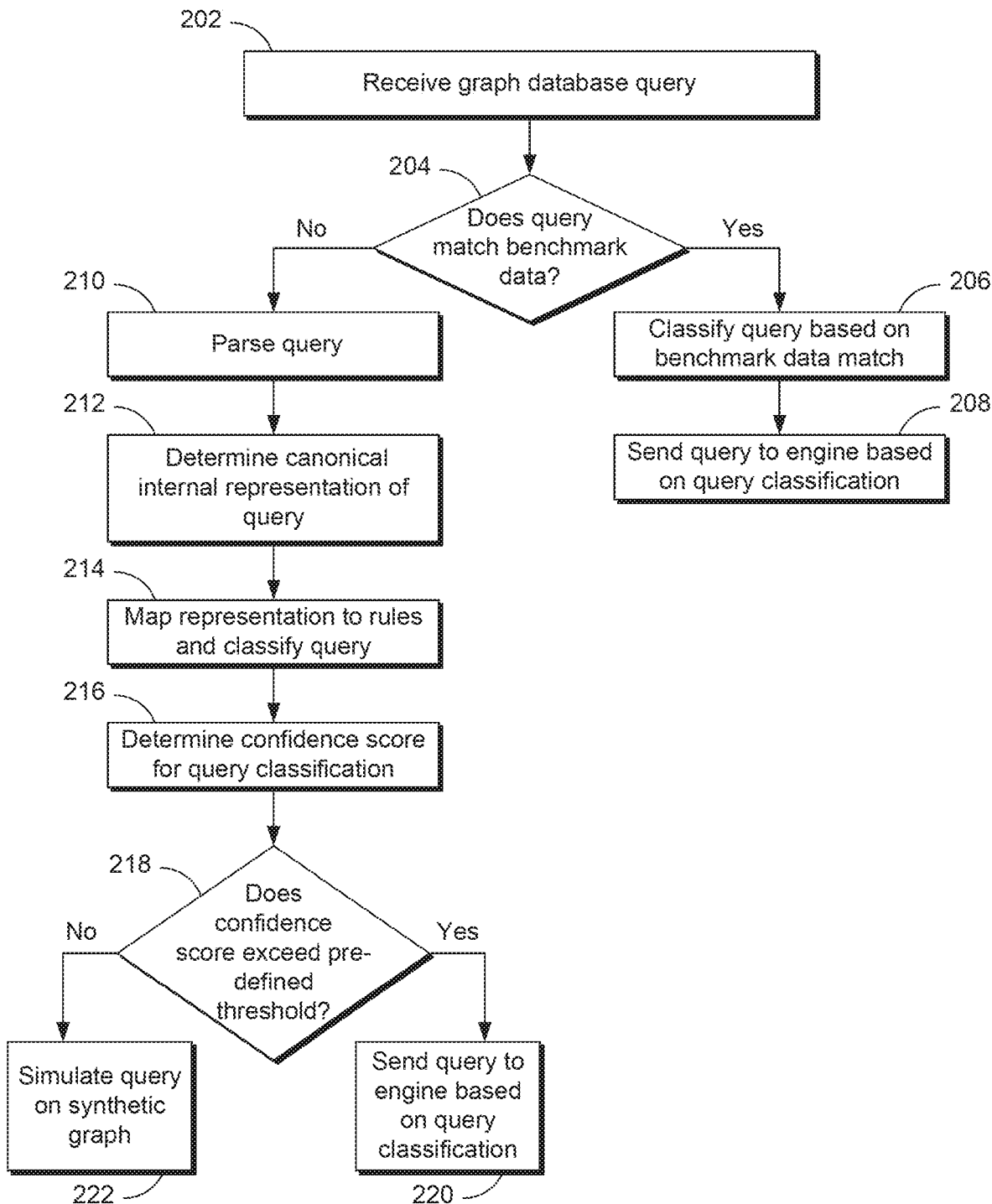
FIG. 2 is a flowchart of classifying graph database queries, according to an example.

FIG. 2 is a flowchart of classifying graph database queries, according to an example.

In block 202, a query is received from, e.g., application 102, which may be an application, process, tool, script, or other engine for purposes of communicating with graph database 104. The query received in block 202 may be a general-purpose or unclassified query. For example, the query may not be classified as either a navigation or short type query, an analytic or long type query, or other query type or classification.

In block 204, a determination may be made as to whether the query matches benchmark data, e.g., data stored in the repository of benchmark data 106. The repository of benchmark data 106 may be a log of previously submitted queries, query types, query classifications, and/or engine information. In some examples, the benchmark data may be sourced from a benchmark council or private enterprise with developed benchmarks for graph databases. The repository of available benchmarks along with a historical log of previously encountered user queries may be maintained as stored procedures along with classifications of the queries, e.g., as long or short queries, along with details as to which query engine may support or be optimized for each query. In block 204, when a new query is received, the query may be compared against the repository of benchmark data 106 for an exact match in some examples, or for a partial match based on, e.g., code similarity, in other examples. As discussed below in more detail, confidence scores and/or thresholds may be used in combination with an exact or partial match.

In block 206, if the query matches a query in the repository of benchmark data 106, the classification for the query may be fetched from the repository. In some examples, the query may then be sent in block 208 to an engine associated with the classification, e.g., graph navigation query engine 112 or graph analytic query engine 114.

In block 210, if the query does not match a query in the repository of benchmark data 108, the query may be sent a query parser, e.g., query parser 108. In some examples, the repository of benchmark data 106 may also be updated with the query, e.g., for purposes of training the repository.

In block 212, after the query is parsed in block 210, a canonical internal representation of the query may be retrieved or determined. A canonical internal representation of a query may, in an example, represent a query computation as a graph of operators in a standardized form such that two queries that are syntactically different, but semantically equivalent, will have the same canonical internal representation. The canonical form of the query may be derived by, for example, a query optimizer for determining an expression of the query optimized for execution.

In block 214, the query in canonical form may be mapped to a set of rules, e.g., rules stored in the repository of benchmark data 106 or elsewhere, which may be based on the pool of available benchmarking data, historical log of previously submitted queries, query types, query classifications, and/or engine information. In some examples, the data in the repository of benchmark data 106 may be mined or used as "training data" for identifying patterns in queries and formulating classification rules.

Mapping the query in canonical form to a set of rules may allow for a determination as to whether the query is a long or short query, e.g., a classification. For example, if the query has recursion, a rule may determine that the query is a long query. In other examples, rules may be based on factors such as the query language, the nature of the graph data, the age of the data being queried, the number of joins in the query, and the iterations in the query.

In block 216, a confidence score for the classification may be determined. In some examples, the confidence score may be based on the number of rules or factors satisfied, on training data, or on other feedback data from previous classifications, executed queries, or simulated queries. The confidence score may be represented as a numeral, a grade, or a percentage.

In block 218, a determination may be made as to whether the confidence score of the classification exceeds a threshold. For example, a user may define that a confidence score of 90% is desired to rely on the classification of blocks 210-214. If the confidence score threshold is met, the query may be sent to an engine based on the classification, e.g., to graph navigation query engine 112 or graph analytic query engine 114.

If the confidence score threshold is not met, the query may be simulated on a synthetic graph in block 222. Simulation of the query is described in more detail below with respect to FIG. 3.

Figure 3:
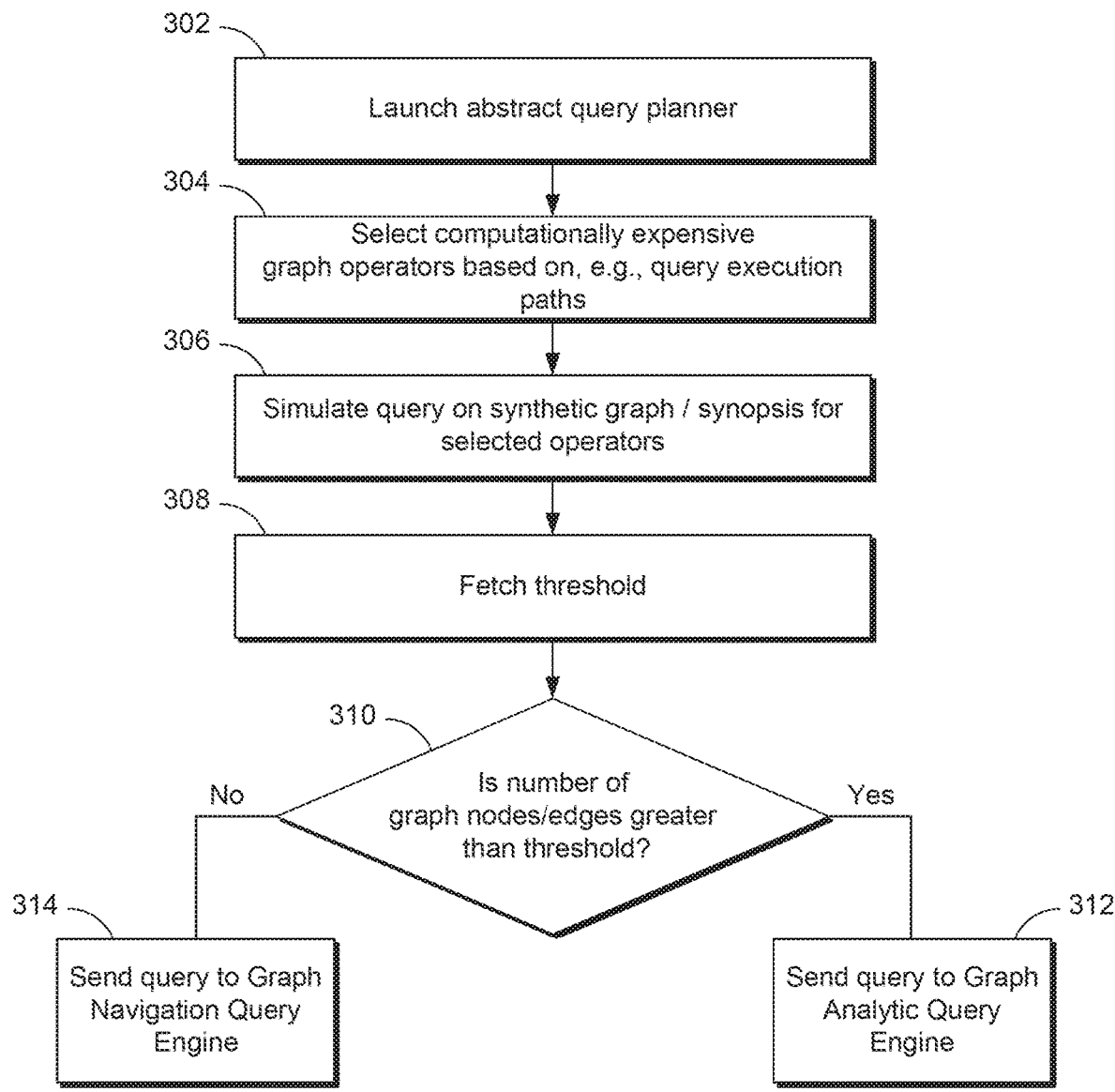
FIG. 3 is a flowchart of simulating graph database queries on a synthetic graph, according to an example.

FIG. 3 is a flowchart of simulating graph database queries on a synthetic graph, according to an example. The flow of FIG. 3 may be invoked if a received query does not match benchmark data, e.g., as shown in 204, and/or if a received query does not map to a rule, as shown in block 218, or does not map with a desired confidence. In other examples, the flow of FIG. 3 may be invoked independent of the flow of FIG. 2. The primary goal of the simulation experiment may be estimating the cost of the graph processing. This computational cost may not be limited to the accessing of graph nodes and/or edges, as it may extend to the estimated resource, i.e., I/O, CPU, communication, and usage for a query execution plan.

In block 302 an abstract query planner may be used to identify computationally expensive graph operators, e.g., operators which demand more computing resources than other operators. The flow of FIG. 3 may not need to execute the entire query to estimate the fraction of the graph accessed. The abstract query planner of a graph data management system may provide artifacts such as metadata, statistics, and indices information that can be used to decide the best execution plan for an input query.

In block 304, the computationally expensive graph operators in the query may be further selected or determined based on, e.g., query execution paths. The resource demands or computational intensity of various graph operators may be stored in a database or rules engine and fetched as part of block 304.

In block 306, execution of the query is simulated on a synthetic graph for the selected operators, while in other examples, execution of the query is simulated on a synopsis of the original graph for the selected operators. A synopsis may be a subset, or sample, of a graph that is much smaller than the original graph but chosen so that the synopsis has features and characteristics that are representative of the original graph, e.g., the statistical distribution of the number of edges to or from a vertex, the statistical distributions of property values, etc. The synthetic graph may be referred to as a "small" graph in comparison to the full graph. Simulation of the query execution may indicate or estimate the proportion of graph nodes accessed by the query, which may indicate whether a query is a navigation query or an analytic query. In some examples, the simulation may be sent to various engines concurrently, e.g., to graph navigation query engine 112 or graph analytic query engine 114.

In block 308, a threshold is fetched. The threshold may indicate, in some examples, a number of nodes or edges in a graph. If the threshold is exceeded, a query may be, or may be likely to be, an analytic query that is likely to access a large number of nodes or edges in a graph. If the threshold is not exceeded, the query may be, or may be likely to be, a navigation query.

In block 310, a determination is made as to whether the threshold is exceeded. The determination may be a calculation as to whether the number or proportion of nodes is less than or greater than the threshold.

In block 312, if the threshold is exceeded, the query may be classified as an analytic or long query. In such examples, the query may be sent to a graph analytic query engine.

In block 314, if the threshold is not exceeded, the query may be classified as a navigation or short query. In such examples, the query may be sent to a graph navigation query engine.

Figure 4:
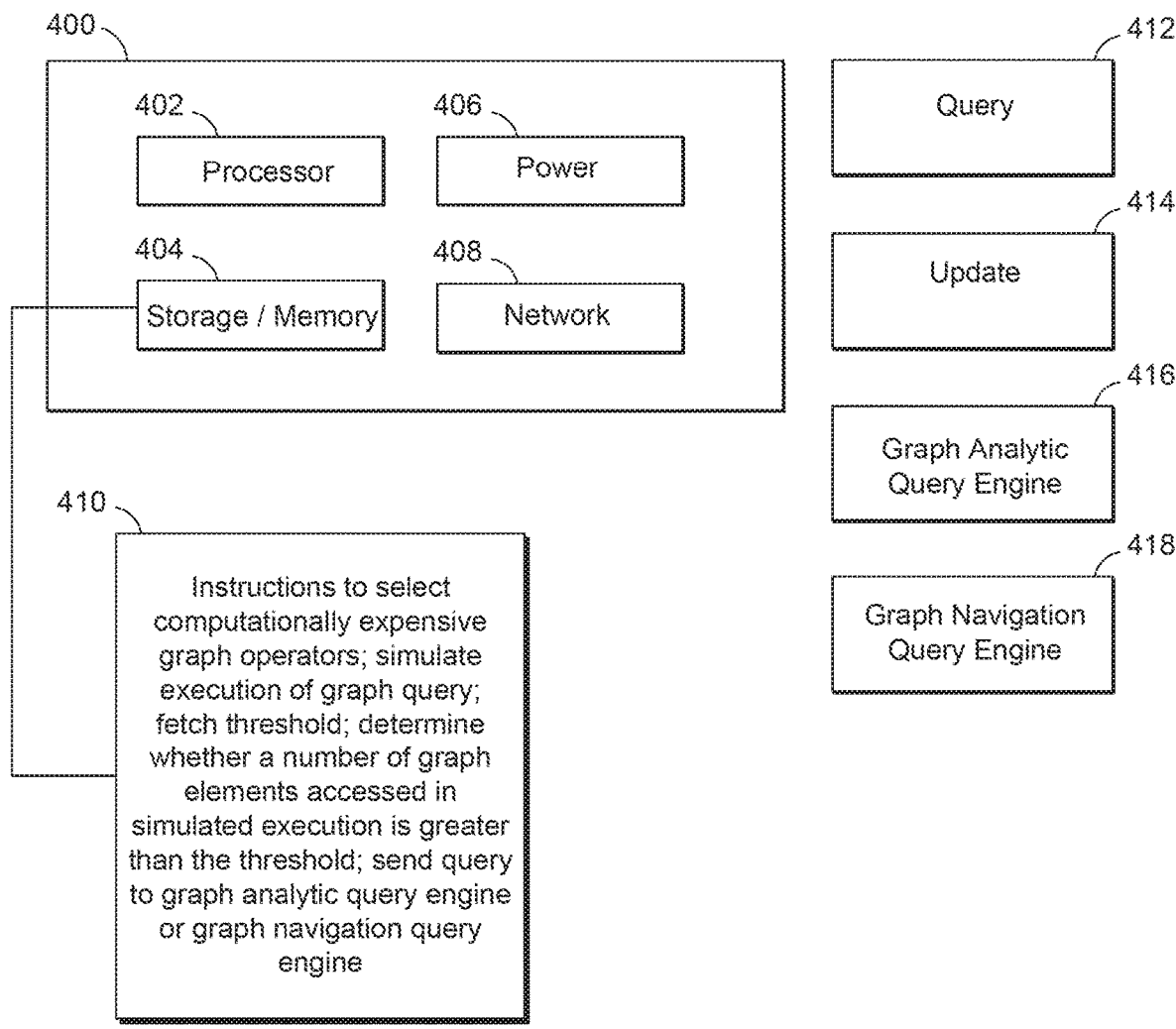
FIG. 4 is a block diagram of a system for graph database query classification, according to an example.

FIG. 4 is a block diagram of a system for graph database query classification, according to an example.

The computing system 400 of FIG. 4 may comprise a processing resource or processor 402. As used herein, a processing resource may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. Processing resource 402 may fetch, decode, and execute instructions, e.g., instructions or engine 410, stored on memory or storage medium 404 to perform the functionalities described herein. In examples, the functionalities of any of the instructions of storage medium 404 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a hard drive, a solid state drive, any type of storage disc or optical disc, and the like, or a combination thereof. Further, any machine-readable storage medium described herein may be non-transitory.

System 400 may also include persistent storage and/or memory. In some examples, persistent storage may be implemented by at least one non-volatile machine-readable storage medium, as described herein, and may be memory utilized by system 400. In some examples, a memory may temporarily store data portions while performing processing operations on them, such as for graph database query classification.

In examples described herein, a machine-readable storage medium or media is part of an article or article of manufacture. An article or article of manufacture may refer to any manufactured single component or multiple components. The storage medium may be located either in the computing device executing the machine-readable instructions, or remote from but accessible to the computing device (e.g., via a computer network) for execution.

In some examples, engine or instructions 410 may be part of an installation package that, when installed, may be executed by processing resource 402 to implement the functionalities described herein in relation to engine or instructions 410. In such examples, storage medium 404 may be a portable medium or flash drive, or a memory maintained by a server from which the installation package can be downloaded and installed. In other examples, engine or instructions 410 may be part of an application, applications, or component(s) already installed on a computing device including a processing resource, e.g., a computing device running any of the components of graph database environment 100 of FIG. 1.

System 400 may also include a power source 406 and a network interface device 408, as described above, which may receive data such as query 412 or update 414, e.g., via direct connection or a network, and/or which may communicate with an engine such as engines 416 and 418.

The engine or instructions 410 in or on the memory or machine-readable storage of system 400 may comprise the methods of FIG. 2 or 3. For example, in the engine of block 410, the instructions may compute a graph synopsis for a graph query, select computationally expensive graph operators in the graph query, and simulate execution of the graph query with the selected operators. A threshold may be fetched, and a determination may be made as to whether a number of graph elements accessed in the simulated execution is greater than the threshold. In the event that the number of graph elements is greater than the threshold, the query may be sent to a graph analytic query engine. In the event that the number of graph elements is less than the threshold, the query may be sent to a graph navigation query engine.

Although the instructions of FIGS. 2-4 show a specific order of performance of certain functionalities, the instructions of FIGS. 2-4 are not limited to that order. For example, the functionalities shown in succession may be performed in a different order, may be executed concurrently or with partial concurrence, or a combination thereof.

All of the features disclosed in this specification, including any accompanying claims, abstract and drawings, and/or all of the elements of any method or process so disclosed, may be combined in any combination, except combinations where at least some of such features and/or elements are mutually exclusive.

What is claimed is:

1. A graph database query classification system, comprising:
    a repository of benchmark data;
    a graph processor engine; and
    a memory storing instructions that when executed cause the graph processor engine to:
        receive a graph query from an application;
        determine whether the graph query matches a previously submitted query stored in the repository of benchmark data;
        in response to a determination that the graph query matches a previously submitted query stored in the repository of benchmark data, classify the graph query to a classification associated with the previously submitted query;
        in response to a determination that the graph query does not match a previously submitted query stored in the repository of benchmark data, determine a canonical internal representation of the graph query, map the canonical internal representation of the graph query to a rule, and classify the graph query to a classification associated with the rule;
        determine a confidence score of the classification of the graph query;
        in response to a determination that the confidence score of the classification of the graph query is less than a threshold score, determine that the classification of the graph query does not meet a predetermined condition; and
        in response to a determination that the classification of the graph query does not meet the predetermined condition, simulate an execution of the graph query on a synthetic graph.

2. The graph database query classification system of claim 1, wherein the rule is determined based on historical logs of queries stored in the repository of benchmark data.

3. The graph database query classification system of claim 1, wherein, to simulate the execution of the graph query, the instructions are executable to cause the graph processor engine to:
    select an operator in the graph query; and
    simulate the execution of the graph query on the synthetic graph for the selected operator.

4. The graph database query classification system of claim 3, wherein the instructions are executable to cause the graph processor engine to:
    determine whether a total number of graph nodes accessed during the simulated execution of the graph query is greater than a threshold number of nodes; and
    in response to a determination that the total number of graph nodes accessed in the simulated execution of the graph query is greater than the threshold number of nodes, classify the graph query as a graph analytic query.

5. The graph database query classification system of claim 4, wherein the instructions are executable to cause the graph processor engine to:
    in response to a determination that the total number of graph nodes accessed in the simulated execution of the graph query is less than the threshold number of nodes, classify the graph query as a graph navigation query.

6. The graph database query classification system of claim 3, wherein the selected operator is an operator that demands more computing resources than other operators in the graph query.

7. A method for classifying a graph database query, comprising:
    receiving a graph query;
    determining whether the graph query matches a previously submitted query stored in a repository of benchmark data;
    in response to a determination that the graph query matches a previously submitted query stored in the repository of benchmark data, classifying the graph query to a classification associated with the previously submitted query;
    in response to a determination that the graph query does not match a previously submitted query stored in the repository of benchmark data, parsing the graph query, determining a canonical internal representation of the graph query, mapping the canonical internal representation of the graph query to a rule, and classifying the graph query into a classification associated with the rule;
    determining a confidence score for the classification of the graph query; and
    in response to a determination that the confidence score does not exceed a threshold score, sending the graph query to a synthetic graph for simulation.

8. The method of claim 7, further comprising:
    selecting operators in the graph query; and
    simulating an execution of the graph query on the synthetic graph for the selected operators.

9. The method of claim 8, further comprising:
   determining whether a total number of graph nodes accessed in the simulated execution of the graph query is greater than a threshold number of nodes; and
   in response to a determination that the total number of graph nodes accessed in the simulated execution is greater than the threshold number of nodes, classifying the graph query as a graph analytic query.

10. The method of claim 9, further comprising:
    in response to a determination that the total number of graph nodes accessed in the simulated execution is less than the threshold number of nodes, classifying the graph query as a graph navigation query.

11. The method of claim 8, wherein the selected operators are operators that demand more computing resources than other operators in the graph query.

12. An article comprising at least one non-transitory machine-readable storage medium that stores instructions executable by a processing resource of a graph database classification system to:
    determine whether a received query matches a previously submitted query stored in a repository of benchmark data;
    in response to a determination that the received query matches a previously submitted query stored in the repository of benchmark data, classify the received query to a classification associated with the previously submitted query;
    in response to a determination that the received query does not match a previously submitted query stored in the repository of benchmark data, determine a canonical internal representation of the received query, map the canonical internal representation of the received query to a rule, and classify the received query to a classification associated with the rule;
    determine a confidence score of the classification of the received query; and
    in response to a determination that the confidence score is less than a threshold score, simulate an execution of the received query on a synthetic graph.

13. The article of claim 12, wherein, to simulate the execution of the received query, the instructions are executable to cause the processing resource to:
    select an operator in the received query; and
    simulate the execution of the received query with the selected operator.

14. The article of claim 13, wherein the instructions are executable to cause the processing resource to:
    determine whether a total number of graph elements accessed in the simulated execution is greater than a threshold number; and
    in response to a determination that the total number of graph elements accessed in the simulated execution is greater than the threshold number, classify the received query as a graph analytic query.

15. The article of claim 14, wherein the instructions are executable to cause the processing resource to:
    in response to a determination that the total number of graph elements is less than the threshold number, classify the received query as a graph navigation query.

16. The article of claim 15, wherein the graph elements are a plurality of graph edges or a plurality of graph nodes.

* * * * *